(12) United States Patent
Suzui

(10) Patent No.: US 8,448,203 B2
(45) Date of Patent: May 21, 2013

(54) DISK DEVICE

(75) Inventor: Yuichiro Suzui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/496,636

(22) PCT Filed: Jan. 21, 2010

(86) PCT No.: PCT/JP2010/000320
§ 371 (c)(1),
(2), (4) Date: Mar. 16, 2012

(87) PCT Pub. No.: WO2011/089645
PCT Pub. Date: Jul. 28, 2011

(65) Prior Publication Data
US 2012/0185884 A1     Jul. 19, 2012

(51) Int. Cl.
*G11B 17/028*     (2006.01)
*G11B 19/20*      (2006.01)
*G11B 7/08*       (2006.01)

(52) U.S. Cl.
USPC ........................................................ 720/700

(58) Field of Classification Search
USPC ........................................................ 720/700
See application file for complete search history.

(56) References Cited

U.S. PATENT DOCUMENTS

| | | | |
|---|---|---|---|
| 6,298,031 B1 | 10/2001 | Morita et al. | |
| 2006/0117334 A1* | 6/2006 | Makino | 720/667 |
| 2007/0044115 A1 | 2/2007 | Murakami | |

FOREIGN PATENT DOCUMENTS

| | | | | |
|---|---|---|---|---|
| JP | 11-273273 | A | | 10/1999 |
| JP | 2000-117929 | A | | 4/2000 |
| JP | 2001126378 | A | * | 5/2001 |
| JP | 2001-344886 | A | | 12/2001 |
| JP | 2006-236401 | A | | 9/2006 |
| JP | 3858438 | B2 | | 12/2006 |
| JP | 2007-58918 | A | | 3/2007 |
| JP | 2008257775 | A | * | 10/2008 |
| JP | 2009037663 | A | * | 2/2009 |

* cited by examiner

*Primary Examiner* — Will J Klimowicz
(74) *Attorney, Agent, or Firm* — Birch, Stewart, Kolasch & Birch, LLP

(57) ABSTRACT

A disk device includes a disk rotation driving unit 7 provided movably in the direction of the Y axis to a chassis 10 and immovably in the direction of the X axis thereto, a guide rail 1 supported parallel to the X axis by the chassis, and an optical pickup 2 supported by the guide rail 1 and reciprocating in a radial direction of a disk which is rotation-driven by the disk rotation driving unit 7, wherein a positioning part 8 performing the positioning of a rotation center of the disk rotation driving unit 7 by making contact with a rotor unit 7a of the disk rotation driving unit 7 is provided on the optical pickup 2.

4 Claims, 2 Drawing Sheets

DISK DEVICE

TECHNICAL FIELD

The present invention relates to a disk device for recording information on a recording medium such as an optical disk, and reproducing the information recorded on the recording medium.

BACKGROUND ART

In this type of disk device, it is required that the rotation center of a disk rotation driving unit (for example, spindle motor) for rotating a turntable on which a disk is mounted be positioned with high precision to the position of a lens of an optical pickup.

Conventionally, for the purpose of the positioning, the positions of a guide shaft for moving an optical pickup in a radial direction of a disk and the rotation center of a disk rotation driving unit are generally adjusted to fall within a prescribed dimensional tolerance. This is a restriction to ensure the reproduction ability of the optical pickup, and the dimensional tolerance is prescribed in a specification or the like of the optical pickup; the positioning is performed by moving the disk rotation driving unit to the guide shaft or by moving the guide shaft to the disk rotation driving unit. A public known example of moving a guide shaft is found in Patent Document 1.

PRIOR ART DOCUMENTS

Patent Documents

Patent Document 1: JP-A-1999-273273 (JP-A-11-273273)

SUMMARY OF THE INVENTION

In the case where the positions of the guide shaft and the rotation center of the disk rotation driving unit are adjusted to be within the allowable dimensional tolerance, because of the narrow range of the dimensional tolerance, it is required that an equipment for positioning and installing the guide shaft and the disk rotation driving unit be of high precision, resulting in a high-priced and upsized equipment.

The reason why the tolerance ranges to be allowed in the dimensions of the guide shaft and the disk rotation driving unit are narrow is caused by association with the positional precision of the lens of the optical pickup. For example, in the case where the tolerance in misalignment between the rotation center of the disk rotation driving unit and the lens of the optical pickup which is allowed to ensure the reproduction ability of the optical pickup is ±0.3 mm, when the positional precision of the optical pickup (misalignment between the guide shaft and the lens of the optical pickup) is ±0.2 mm, it is required that the precision from the guide shaft to the rotation center of the disk rotation driving unit be within ±0.1 mm, which makes it necessary to enhance further the positioning accuracy.

The present invention has been made to solve the above-mentioned problems, and an object of the invention is to provide a disk device having a configuration such that the rotation center of a disk rotation driving unit is adjusted with an optical pickup, so that the adjustment can be performed with high accuracy and in a simple way, in light of the fact that the position of the rotation center of the disk rotation driving unit is conventionally adjusted from the guide shaft.

A disk device of the invention includes: a disk rotation driving unit provided movably in the direction of the Y axis to a chassis and immovably in the direction of the X axis thereto; a guide rail supported parallel to the X axis by the chassis; and an optical pickup supported by the guide rail and reciprocating in a radial direction of a disk which is rotation-driven by the disk rotation driving unit, wherein a positioning part performing the positioning of a rotation center of the disk rotation driving unit by making contact with a rotor unit of the disk rotation driving unit is provided on the optical pickup.

According to the disk device of the invention, the rotation center of the disk rotation driving unit is adjusted to the optical pickup in such a manner that the rotor unit of the disk rotation driving unit is made contact with the positioning part of the optical pickup, and thus the adjustment can be performed extremely simply with high accuracy.

BEST MODE FOR CARRYING OUT THE INVENTION

In the following, embodiments of the present invention will be described in detail with reference to the accompanying drawings.

First Embodiment

Figure 1:
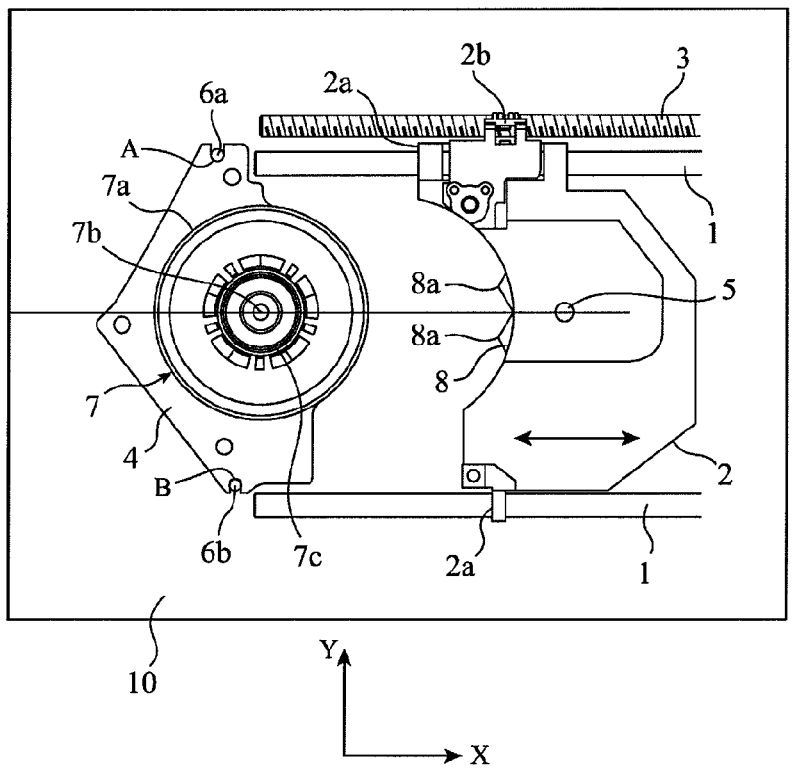
FIG. 1 is a schematic view showing the main parts of a disk reproducing device of the present invention, and a top plan view of an assembling process of an optical pickup to a disk rotation driving unit.
Figure 2:
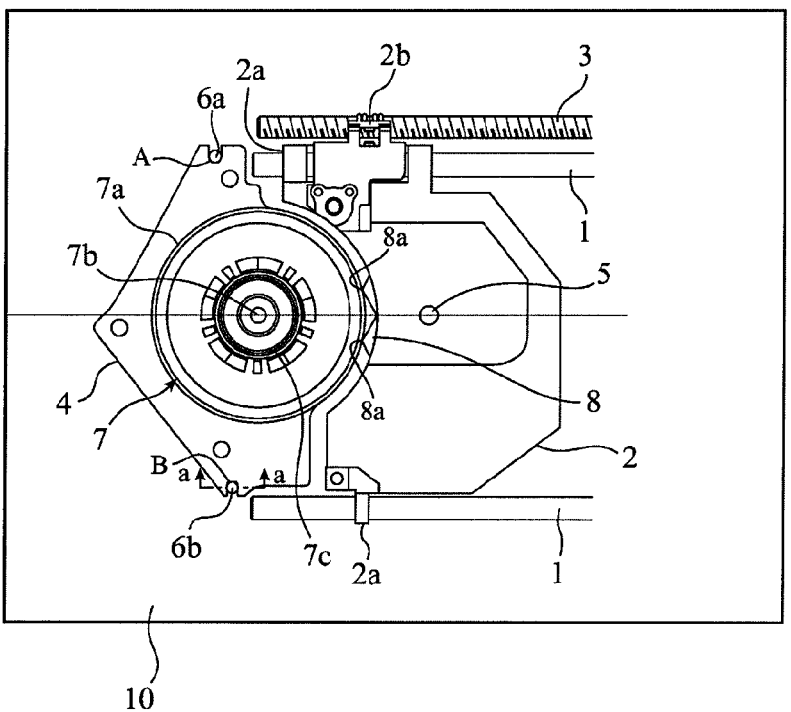
FIG. 2 is a schematic view showing the main parts of the disk reproducing device of the invention, and a top plan view of a assembled state of the optical pickup to the disk rotation driving unit.
Figure 3:
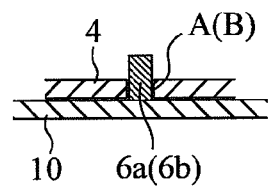
FIG. 3 is a transverse sectional view taken along line a-a in FIG. 2.

In FIG. 1, two guide shafts (rails) 1, 1 are supported parallel to each other at a distance to support an optical pickup 2 with respect to a chassis (reproduction base) 10. The optical pickup 2 is reciprocatably supported to the guide shafts 1, 1 by means of arms 2a provided on both sides thereof. A screw rod 3 is supported parallel to the guide shaft 1 rotatably with respect to the chassis 10 by means of a bearing part (not shown), a thread part 2b formed integrally with one of the arms 2a of the optical pickup 2 is engaged with the screw rod 3, and thereby driving force is transmitted to the optical pickup 2 through the thread part 2b.

A positioning part 8 that positions the rotation center of the disk rotation driving unit 7 by abutting a rotor unit 7a of the disk rotation driving unit 7 against the face of the pickup opposed to the rotor unit 7a is provided in the optical pickup 2. The positioning part 8 is a V-shaped protrusion such that a straight line linking the center of a circular arc passing through two apexes 8a, 8a to the center of a lens of the optical pickup 2 is made parallel to the moving direction of the optical pickup.

The disk rotation driving unit 7 is fixed to the chassis 10 through a base plate 4, and the rotor unit 7a integrated with a turntable is attached to a rotating shaft 7b of the disk rotation driving unit 7. A disk mounted on the turntable is rotated with clamped from above of the figure by a disk clamping means (not shown). At this time, the rotation center of the disk rotation driving unit 7 coincides with that of the disk, in such a manner that the center hole of the disk is fitted in a central cone part 7c attached to the rotor unit 7a.

The base plate 4 has cutout recesses A, B at the fringes of two opposing sides thereof, engages positioning protrusions 6a, 6b provided on the chassis 10 with the cutout recesses A, B to be positioned and fixed on the chassis 10, respectively, when assembled to the chassis 10; due to the cutout recesses A, B, the base plate 4 cannot be moved in the direction of the X axis, while it can be moved in the direction of the Y axis. Therefore, when the base plate 4 is moved in the direction of the Y axis and the base plate is fixed by screw fixation or the like, a straight line which links the rotation center of the disk rotation driving unit 7 to the center of the lens of the optical pickup 2 coincides with the moving direction of the optical pickup.

Next, a procedure where the disk rotation driving unit 7 is positioned with respect to the optical pickup 2 will be described. Under the condition where positioning holes A, B of the base plate 4 to which the disk rotation driving unit 7 is attached are engaged with the positioning protrusions 6a, 6b of the chassis 10, the optical pickup 2 is moved up to the position to make contact with the rotor unit 7a of the disk rotation driving unit 7. At this time, two apexes 8a, 8a of the V-shaped protrusion working as the positioning part 8 make contact with the rotor unit 7a.

The V-shaped protrusion is formed such that a straight line linking the center of a circular arc passing through the two apexes 8a, 8a to the center of the lens of the optical pickup 2 is parallel to the moving direction of the optical pickup, the base plate 4 on which the disk rotation driving unit 7 is mounted cannot be moved in the direction of the X axis, but can be moved in the direction of the Y axis; further, since the rotor unit 7a of the disk rotation driving unit 7 has a circular arc shape, the base plate 4 is moved in the direction of the Y axis to make contact with the two apexes 8a, 8a. Under such a condition, the base plate 4 is fixed to the chassis 10 by a method of screw fixation or the like, and thereby the rotation center of the disk rotation driving unit 7 and the center of the lens of the optical pickup 2 coincides with the moving direction of the optical pickup.

Incidentally, a position where the two apexes 8a, 8a of the V-shaped protrusion 8 of the optical pickup 2 are made contact with the external face of the rotor unit of the disk rotation driving unit 7 is out of the area where reproduction/recording are performed to the disk by the optical pickup 2, and thus there is no harm the in reproduction/recording to the disk. The optical pickup 2 is moved in a radial direction (inner and outer peripheral directions) of the disk to read disk information at a predetermined position or record information to the disk.

As discussed above, according to the first embodiment, the disk device includes: the disk rotation driving unit provided movably in the direction of the Y axis to the chassis and immovably in the direction of the X axis thereto; the guide rail supported parallel to the X axis by the chassis; and the optical pickup supported by the guide rail and reciprocating in the radial direction of the disk which is rotation-driven by the disk rotation driving unit, wherein the positioning part performing the positioning of a rotation center of the disk rotation driving unit by making contact with the rotor unit of the disk rotation driving unit is provided on the optical pickup; therefore, there is an advantageous effect such that the adjustment of the mounting position of the rotation center of the disk rotation driving unit can be performed with high accuracy and simply.

Hereupon, in the first embodiment, the V-shaped protrusion is provided on the optical pickup 2; however, even when a member having a V-shaped protrusion shape is attached to the optical pickup 2 corresponding to the lens position of the optical pickup 2, a similar advantageous effect can be obtained.

Further, though the positioning holes A, B are formed in the two opposing sides of the base plate 4 to which the disk rotation driving unit 7 is attached, in the case where the disk rotation driving unit 7 is fixed directly to the chassis 10, the location holes A, B may be directly formed in the disk rotation driving unit 7.

INDUSTRIAL APPLICABILITY

It is effective for performing the adjustment of the mounting position of the rotation center of the disk rotation driving unit with respect to the optical pickup in the disk device with high precision.

The invention claimed is:

1. A disk device comprising:
   a disk rotation driving unit provided movably in the direction of the Y axis to a chassis and immovably in the direction of the X axis thereto;
   a guide rail supported parallel to the X axis by the chassis; and
   an optical pickup supported by the guide rail and reciprocating in a radial direction of a disk which is rotation-driven by the disk rotation driving unit,
   wherein a positioning part performing the positioning of a rotation center of the disk rotation driving unit by making contact with a rotor unit of the disk rotation driving unit is provided on the optical pickup.

2. The disk device according to claim 1, wherein the positioning part is a V-shaped protrusion in which a straight line linking the center of a circular arc passing through apexes in two places to the center of a lens of the optical pickup is parallel to the moving direction of the optical pickup.

3. The disk device according to claim 2, wherein the V-shaped protrusion is integrally formed with the optical pickup.

4. The disk device according to claim 2, wherein the V-shaped protrusion is that a member having a V-shaped protrusion shape is provided on the optical pickup corresponding to a lens position of the optical pickup.

* * * * *